Feb. 20, 1923.

F. C. MATTESON

WHEEL

Filed May 17, 1920

Inventor
Fred C. Matteson
By George W. Upton
Attorney

Patented Feb. 20, 1923.

1,446,427

UNITED STATES PATENT OFFICE.

FRED C. MATTESON, OF WARREN, OHIO.

WHEEL.

Application filed May 17, 1920. Serial No. 381,799.

*To all whom it may concern:*

Be it known that I, FRED C. MATTESON, a citizen of the United States of America, residing at Warren, in the county of Trumbull and State of Ohio, have invented certain new and useful Improvements in Wheels, of which the following is a specification.

My invention relates to improvements in wheels for tractors, trucks, tanks etc. the rims of which are provided with protruding cleats on their peripheries; and the objects of my improvements are, first, to provide wheels that will grip and hold when rolled over soil, turf or earth; second, to avoid injury to brick or other hard pavements, when rolled thereover; third, to provide such wheels with no loose parts, easily broken when used by others; and fourth to provide " dual-purpose " wheels for tractors, etc., suitable for use on hard pavements and on unpaved places.

I attain those objects by the mechanism illustrated in the accompanying drawings, in which—

Figure 1:
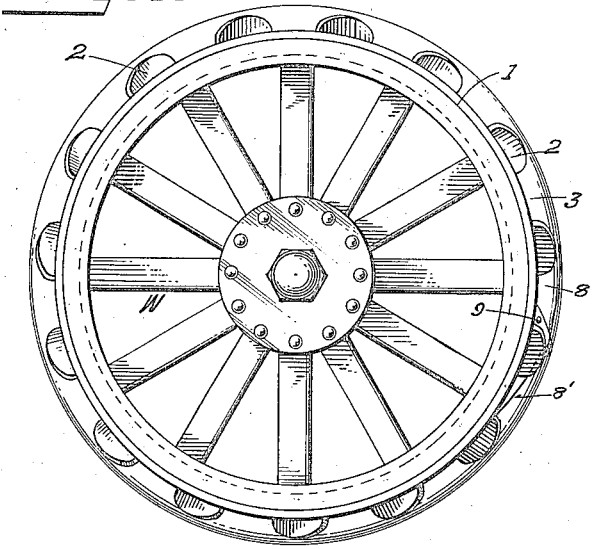
Figure 2:
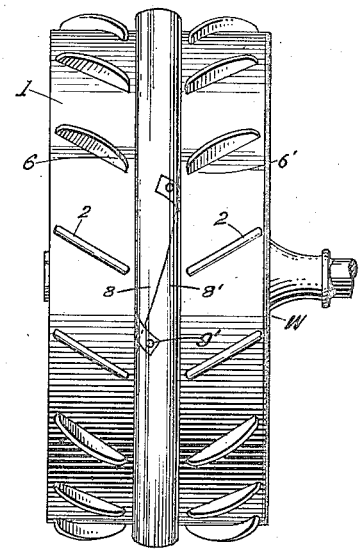
Figure 3:
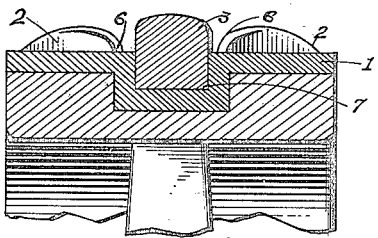
Figure 6:
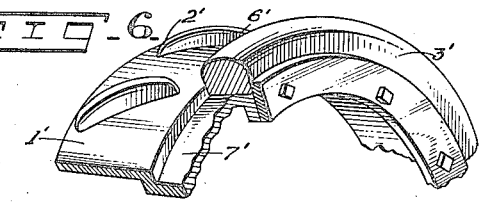
Figure 4:
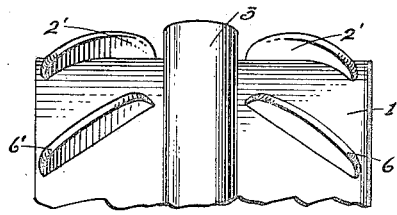
Figure 5:
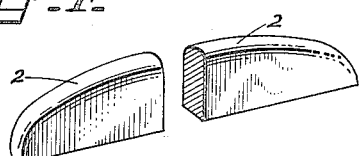
Figure 7:
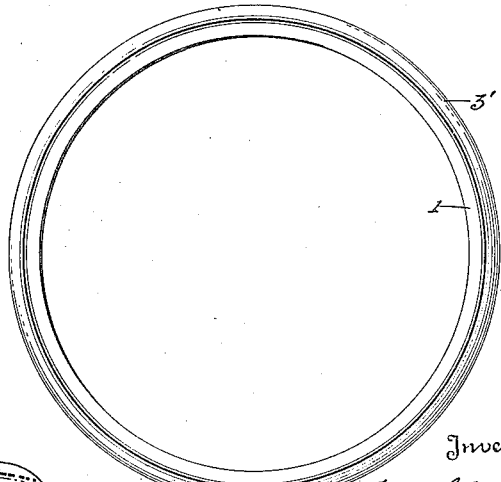

Figure 1. is a side view of a wheel with my invention attached; Fig. 2. is a front view of the same; Fig. 3. is a view in section (broken away) of the upper periphery of the wheel, with my cleats attached; Fig. 4. is a view of the same in perspective; Fig. 5. is a perspective of a pair of my improved cleats; Fig. 6. shows a modification and Fig. 7. is a view of an uncut tire on a rim.

Similar characters refer to like parts throughout the several views.

The rim 1, is provided with cleats 2, 2', protruding from its periphery and extending only so far across it as to permit of the use of a tire, 3, 3', surrounding the rim and located, preferably, near its middle, though it may be at either side, as shown in Fig. 6.

As tractors and trucks already in use weigh as much as from 3 to 10 tons; when it is necessary to drive one over a brick or other made pavement, the cleats on the peripheries of the wheels, (W,) of necessity crack, split or crush the bricks or other component material.

In such wheels, the corner or end of the cleat (2) which first touches the ground or pavement, is what does the most damage; those ends I have designated by 6, 6', Figs. 4. and 6., consequently, as a preliminary preventative of pavement injury, I make those ends (6, 6') of the cleats (2, 2') slightly rounded or beveled or both, that they may roll on and over bricks etc. or loose obstacles on a pavement, with a crawling up or lifting function as to the wheel, and a grinding or crushing function as to any foreign matter met; which not only serves to prevent a hammering blow of a corner of the cleat on a pavement, but also serves to grind and crush foreign matter mentioned.

That the cleats may " take hold " on yielding soil and then force the loose soil or mud outwardly of the vehicle, they are located angularly in relation to the exterior of the rims.

I provide a channel, 7, between the adjacent sets of cleats 2, 2, (or at one side thereof as in Fig. 6, at 7' when but one set of cleats is used) for the reception of a tire 3 (Fig. 6—3'.) which tire protrudes slightly above and outside of the extreme diameter of said cleats, 2, 2; and on said tires the wheels roll on hard pavements, lifting the cleats slightly out of contact therewith.

On the other hand, said tires sink slightly, and first, into soil or soft roads or earth, and allow the cleats to take hold for propulsion of the tractor etc.

By a transverse cut, making the two edges 8, 8' across the tire (not when made of rubber) Figs. 1 and 2, a secure method of attaching such tires is had, because their own resiliency tends to firmly hold them in attachment, and additional security can be had by binding the meeting edges 8, 8' by suitable bolts 9, 9'.

I am aware that tires protruding beyond the peripheries of rims of wheels and located in grooves thereon have been used; and that tires comprising a plurality of sections, segments or parts, designed to be bolted together or to the rims, have been used, and I use but one piece as a tire in either type, and do not broadly claim from those described, but my invention has, as one of its principal values, that durability which dependence upon a multiplicity of parts lacks; and on mechanism not beyond the comprehension and manipulation of ordinary users who may not be skilled mechanicians.

I claim:—

A tractor wheel comprising a rim having a central peripheral groove, a tire seated within said groove, and cleats arranged in pairs symmetrically disposed on the rim upon opposite sides of the groove and slanting obliquely in opposite directions, the outer periphery of the tire projecting beyond the cleats, said cleats having an arcuate form, to thereby provide a contacting surface upon curvilinear lines in each direction from the highest point of the arch thereof, whereby the inner ends of the cleats may exert a lifting effort upon the wheel as they contact with the ground.

In testimony whereof I affix my signature in presence of two witnesses.

FRED C. MATTESON.

Witnesses:
 H. T. UPTON,
 H. H. THOMPSON.